(12) United States Patent
Chamberlain

(10) Patent No.: US 12,053,953 B2
(45) Date of Patent: Aug. 6, 2024

(54) LAMINATED GLASS HAVING A CONNECTOR, METHOD OF MANUFACTURING THE SAME AND USE OF THE SAME

(71) Applicant: Pilkington Group Limited, Nr. Ormskirk (GB)

(72) Inventor: Mark Andrew Chamberlain, Ormskirk (GB)

(73) Assignee: PILKINGTON GROUP LIMITED, Lancashire (GB)

( * ) Notice: Subject to any disclaimer, the term of this patent is extended or adjusted under 35 U.S.C. 154(b) by 0 days.

(21) Appl. No.: 17/801,821

(22) PCT Filed: Mar. 8, 2021

(86) PCT No.: PCT/EP2021/055805
§ 371 (c)(1),
(2) Date: Aug. 24, 2022

(87) PCT Pub. No.: WO2021/176103
PCT Pub. Date: Sep. 10, 2021

(65) Prior Publication Data
US 2023/0087157 A1    Mar. 23, 2023

(30) Foreign Application Priority Data
Mar. 6, 2020 (GB) ..................... 2003291

(51) Int. Cl.
*B32B 3/10* (2006.01)
*B32B 7/02* (2019.01)
(Continued)

(52) U.S. Cl.
CPC .......... *B32B 17/10348* (2013.01); *B32B 7/02* (2013.01); *B32B 7/12* (2013.01);
(Continued)

(58) Field of Classification Search
None
See application file for complete search history.

(56) References Cited

U.S. PATENT DOCUMENTS

| 4,137,447 A | 1/1979 | Boaz |
| 5,886,321 A | 3/1999 | Pinchok et al. |

(Continued)

FOREIGN PATENT DOCUMENTS

| CN | 2832515 Y | 11/2006 |
| CN | 101594988 A | 12/2009 |

(Continued)

OTHER PUBLICATIONS

International Search Report (PCT/ISA/210) and Written Opinion (PCT/ISA/237) dated Jun. 15, 2021, by the European Patent Office as the International Searching Authority for International Application No. PCT/EP2021/055805. (9 pages).

(Continued)

*Primary Examiner* — Christopher M Polley

(57) ABSTRACT

A laminated glass comprises first and second glass sheets and a ply of interlayer material disposed therebetween, a conductive strip disposed on the ply of interlayer material, a connector arranged at an edge of the second glass sheet, a ceramic ink layer on a surface of the second glass sheet not facing the ply of interlayer material and partly obscuring the conductive strip, a gap in the ceramic ink layer configured so that the conductive strip is in contact with the connector in the gap. Also, there is a method for manufacturing the laminated glass and use of the laminated glazing.

19 Claims, 6 Drawing Sheets

(51) Int. Cl.
*B32B 7/12* (2006.01)
*B32B 17/10* (2006.01)

(52) U.S. Cl.
CPC .. *B32B 17/10036* (2013.01); *B32B 17/10174* (2013.01); *B32B 17/10293* (2013.01); *B32B 17/10385* (2013.01); *B32B 17/10935* (2013.01); *B32B 2250/40* (2013.01); *B32B 2255/20* (2013.01); *B32B 2305/345* (2013.01); *B32B 2307/202* (2013.01); *B32B 2307/206* (2013.01); *B32B 2307/732* (2013.01); *B32B 2315/08* (2013.01); *B32B 2419/00* (2013.01); *B32B 2457/208* (2013.01); *B32B 2479/00* (2013.01); *B32B 2605/006* (2013.01); *B32B 2605/12* (2013.01); *B32B 2605/18* (2013.01)

(56) References Cited

U.S. PATENT DOCUMENTS

| | | | |
|---|---|---|---|
| 7,520,416 | B2 | 4/2009 | Crumbach et al. |
| 2018/0162104 | A1* | 6/2018 | Chamberlain ...... B32B 17/1022 |
| 2018/0222156 | A1* | 8/2018 | Klein ............... B32B 17/10036 |

FOREIGN PATENT DOCUMENTS

| | | | | |
|---|---|---|---|---|
| CN | 102975432 A | 3/2013 | | |
| CN | 203681211 U | 7/2014 | | |
| CN | 105253706 A | 1/2016 | | |
| CN | 105848884 A | 8/2016 | | |
| CN | 106029371 A | 10/2016 | | |
| CN | 107667080 A | 2/2018 | | |
| CN | 109177388 A | 1/2019 | | |
| CN | 109644528 A | 4/2019 | | |
| EP | 1466877 A1 | 10/2004 | | |
| JP | 2019099405 A | 6/2019 | | |
| WO | WO-2013076513 A1 * | 5/2013 | .............. B60J 1/004 |
| WO | WO-2015124926 A1 * | 8/2015 | ....... B32B 17/10005 |
| WO | 2016193669 A1 | 12/2016 | | |
| WO | 2019107460 A1 | 6/2019 | | |

OTHER PUBLICATIONS

Patents Act 1977: Error in Search Report dated Aug. 11, 2020 and Corrected Search Report Under Section 17 dated Jul. 30, 2020 issued by the Intellectual Property Office in Great Britain Patent Application No. GB2003291.8. (2 pages).

Notification of the First Office Action issued by the Chinese Patent Office in corresponding Chinese Patent Application No. 202180018882.2, dated Apr. 28, 2023, with English Translation only (8 pages).

* cited by examiner

LAMINATED GLASS HAVING A CONNECTOR, METHOD OF MANUFACTURING THE SAME AND USE OF THE SAME

FIELD OF THE INVENTION

The present invention concerns a laminated glass having a connector, a method of manufacturing such a laminated glass and use of the same, for example, in a window.

BACKGROUND OF THE INVENTION

Laminated glass having an electrical connector positioned between two plies of glazing material is well known. A vehicle window may comprise a connector, in electrical contact with a busbar of a heating circuit or a component of an antenna. The connector may be positioned near an edge of the laminated glass for connecting to an external circuit. A ceramic ink layer known as an obscuration band may be provided at an edge region of the laminated glass to obscure a view of components at, or near, the edge.

EP1466877A1 (Noguchi) discloses a windshield laminated glass comprising two glass sheets bonded to each other with a thermoplastic resin film. Busbars for feeding electricity to a transparent conductive film are formed on surface 3, numbered from the outside of the laminated glass. A ceramic print in a frame-like form is on surface 2 and covers the busbars and feed parts of the busbars connected to feed wires.

U.S. Pat. No. 7,520,416B2 (Crumbach) discloses a laminated glass comprising two glass sheets and an interlayer disposed between them. An obscuration band is provided by a printed ceramic ink layer forming an opaque coating on surface 4 having a cut-out where the surface of the glass sheet is exposed. An electrical conductor is printed in the cut-out where the substrate glass is exposed. A soldered connection is made on surface 4.

OBJECTIVES OF THE INVENTION

An objective of the invention is to provide a laminated glass comprising an electrical connector having lighter weight and improved strength. Another objective is to provide a method of manufacturing said laminated glass with increased yield by avoiding breakage of thin plies of glazing material. Another objective is to use said laminated glass in a window compliant with industry standards.

SUMMARY OF THE INVENTION

In a first aspect, the present invention provides a laminated glass comprising the features set out in claim 1.

The invention provides a laminated glass, comprising first and second glass sheets and at least a ply of interlayer material disposed therebetween; a conductive strip disposed on the ply of interlayer material; a connector arranged at an edge of the second glass sheet for connecting with an external circuit; a ceramic ink layer on a surface of the second glass sheet not facing the ply of interlayer material and partly obscuring the conductive strip; and a gap in the ceramic ink layer configured so that the conductive strip is in contact with the connector in the gap.

The invention is advantageous because a laminated glass having a connector and a gap in a ceramic ink layer, configured so that a conductive strip is in contact with the connector in the gap, has improved strength compared with prior art not having a gap. The gap is an area without a ceramic ink layer.

Surprisingly, the inventor has found that the gap in the ceramic ink layer on the glass sheet results in compressive stress in surface 4 of the glass sheet greater than tensile stress in surface 4 of the glass sheet due to the conductive strip in contact with, or overlapping, the connector. Preferably, the conductive strip overlaps the connector.

The gap in the ceramic print is not disclosed in U.S. Pat. No. 7,520,416B2, where a cut-out is provided in the conductive strip to provide an observation window for visual inspection of a solder layer.

As a result of configuring the gap in the ceramic ink layer so that the conductive strip is in contact with the connector in the gap, the laminated glass has improved strength and passes temperature cycling tests for a vehicle windshield.

In a preferred embodiment the strength improvement is enough to allow thinner glass to be used, providing a lightweight product suitable for use as a vehicle windshield. Lightweight vehicle components are advantageous for fuel efficiency of a vehicle.

Preferably, thickness of the first glass sheet or the second glass sheet is less than or equal to 2 mm, more preferably less than or equal to 1.8 mm, more preferably less than or equal to 1.4 mm, more preferably less than or equal to 1.0 mm; most preferably less than or equal to 0.7 mm.

Preferably, thickness of a first glass sheet is greater than thickness of a second glass sheet.

Preferably, an outer glass sheet thickness is 1.8 mm and an inner glass sheet thickness is 1.4 mm; more preferably an outer glass sheet thickness is 2.1 mm and an inner glass sheet thickness is 1.0 mm.

Preferably, first and second glass sheets are soda-lime glass, and/or float glass.

Preferably, the second glass sheet is annealed, more preferably semi-toughened having surface stress 20-25 MPa; more preferably heat strengthened having surface stress 40-55 MPa; most preferably fully tempered having surface stress 65-69 MPa.

Preferably, a ply of interlayer material is a polymer, such as thermoplastic resin, more preferably polyvinyl butyral (PVB). Preferably, ply of interlayer material thickness is less than or equal to 0.76 mm. The ply of interlayer material may comprise two plies of interlayer material, for example a pair of PVB plies, having thickness 0.76 mm and 0.38 mm for acoustic performance, or 0.38 mm and 0.38 mm wherein one ply has an infra-red reflective (IRR) coating; or may comprise three plies of interlayer material, wherein a middle ply may comprise polyethylene terephthalate (PET), having thickness 0.1 mm and having a coating for solar control performance.

Preferably, the gap extends from the edge of the second glass sheet towards the centre of the second glass sheet, preferably by at least 22 mm, more preferably by at least 28 mm.

Preferably, the gap extends parallel with the edge of the second glass sheet, preferably by at least 32 mm, more preferably by at least 38 mm.

Preferably, a second ceramic ink layer is on surface 2 of the laminated glass.

Preferably, a ceramic ink layer comprises a frit and a pigment, preferably the ceramic link layer is not transparent, more preferably black or opaque. Preferably the ceramic ink layer is printed, more preferably screen printed.

Preferably, the conductive strip is metal, preferably copper, such as tinned copper, preferably having a thickness 100 µm or less, more preferably 50 µm or less.

Preferably, the connector comprises a conductor and an insulating film at least partly covering the conductor, preferably the connector is a flat cable, more preferably the conductor has no insulating film where the conductive strip is in contact with the connector.

Preferably, the connector has conductor thickness 100 µm or less, more preferably 80 µm or less.

Preferably, the connector has insulating film thickness 50 µm or less, more preferably 30 µm or less.

Preferably, the connector is bonded to the second glass sheet by an adhesive film; preferably the thickness of the adhesive film is 130 µm or less, more preferably 100 µm or less.

In a second aspect, the present invention provides a method for manufacturing a laminated glass comprising the steps set out in claim 13.

The invention provides a method for manufacturing a laminated glass, comprising steps of providing first and second glass sheets and disposing a ply of interlayer material therebetween; disposing a conductive strip on the ply of interlayer material or on the second glass sheet; arranging a connector at an edge of the second glass sheet for connecting with an external circuit; depositing a ceramic ink layer on a surface of the second glass sheet not facing the ply of interlayer material and partly obscuring the conductive strip; and configuring a gap in the ceramic ink layer so that the conductive strip is in contact with the connector in the gap.

Preferably, the connector (5) is disposed on the ply of interlayer material (3).

Preferably, the conductive strip (4) is configured to overlap the connector (5).

In an embodiment, the ceramic ink layer may be pre-fired, and/or the second ceramic ink layer may be pre-fired.

In a third aspect, the present invention provides for use of a laminated glass, as set out in claim 15. The invention may be used for windows of buildings, street furniture, touchscreens, doors for white goods or windows of vehicles for land, sea and air. Preferably, the invention may be used as a window of a motor vehicle, namely a windshield, a rear window, a side window or a roof window.

The invention will now be further disclosed by non-limiting drawings, non-limiting examples and a comparative example.

DETAILED DESCRIPTION OF THE INVENTION

Figure 1:
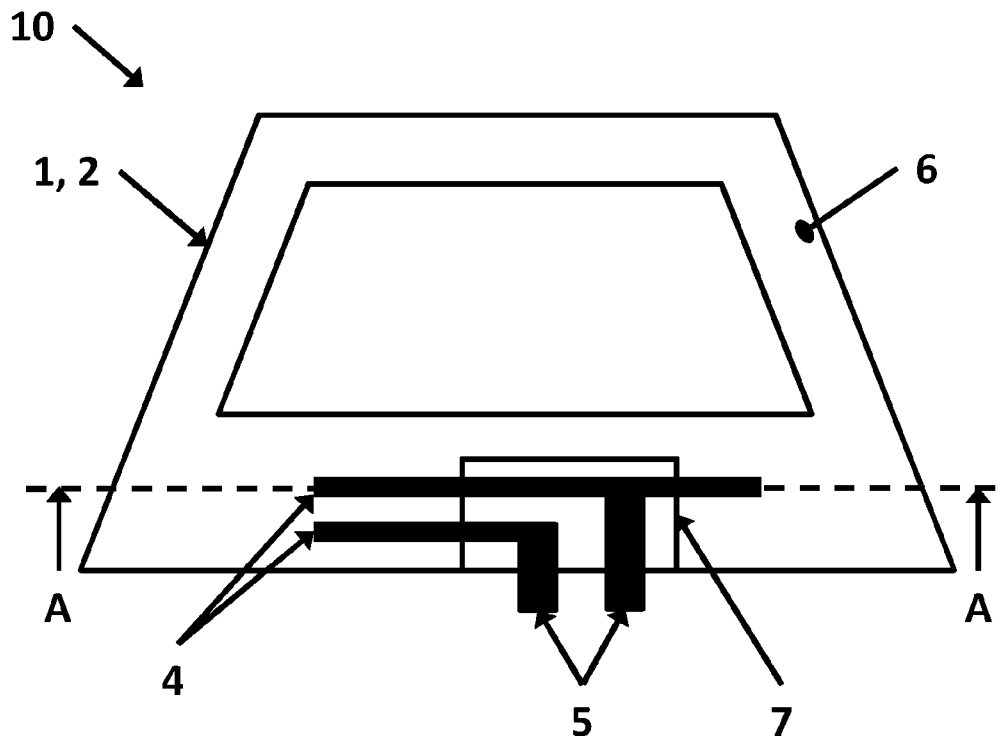
FIG. 1 is an embodiment of the invention having a gap in a ceramic ink layer.

FIG. 1 discloses a laminated glass (10) according to the invention comprising a first glass sheet (1) and a second glass sheet (2) bonded together by a ply of interlayer material (3).

A surface of the first glass sheet (1) not facing the ply of interlayer material (3) is surface 1 (S1). A surface of the first glass sheet (1) facing the ply of interlayer material (3) is surface 2 (S2). A surface of the second glass sheet (2) facing the ply of interlayer material (3) is surface 3 (S3). A surface of the second glass sheet (2) not facing the ply of interlayer material (3) is surface 4 (S4).

For example, the laminated glass (10) is a window wherein the first glass sheet (1) is an outer glass sheet and the second glass sheet (2) is an inner glass sheet and the surfaces (S1, S2, S3, S4) are numbered in sequence from the outside.

A conductive strip (4) is disposed on the ply of interlayer material (3). Examples of conductive strip (4) include a busbar for distributing electrical power to a heating element, or a connection pad for an antenna or a sensor. Two conductive strips (4) may be provided as positive and negative busbars for a heating element.

A connector (5) is arranged at an edge of the second glass sheet (2) for connection to an external circuit. Examples of an external circuit include a power supply for heating the laminated glass (10), an amplifier for receiving or transmitting a signal via an antenna on the laminated glass (10). Two connectors (5) connect to two conductive strips (4) respectively.

A ceramic ink layer (6) is deposited on a surface (S4) of the second glass sheet (2) not facing the ply of interlayer material (3), partly obscuring the conductive strip (4). The ceramic ink layer (6) may be an obscuration band to obscure a view of components at, or near, the edge.

A gap (7) in the ceramic ink layer (6) is provided and configured so that the conductive strip (4) contacts or overlaps the connector (5) in the gap (7). The gap (7) may be any shape. For example, rectangular (as shown), triangular or any other polygonal shape.

Two connectors (5) may be provided in the same gap (7). For example, two connectors side by side on a laminated glass windshield allows easy connection of two cables of a vehicle wiring loom.

Figure 2:
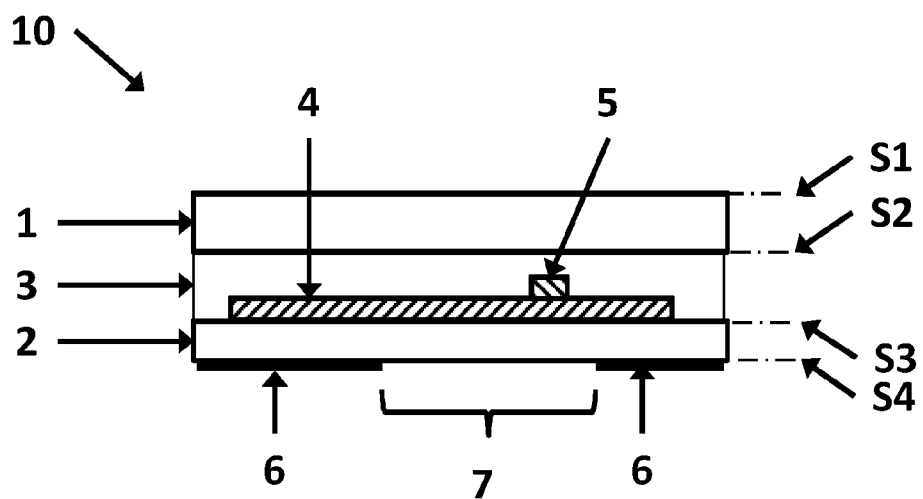
FIG. 2 is the embodiment of FIG. 1 in cross-section.

FIG. 2 is a cross-section of the laminated glass (10) of FIG. 1 on the line A-A. The conductive strip (4) is on the ply of interlayer material (3) and overlaps the connector (5) in the gap (7).

Figure 3:
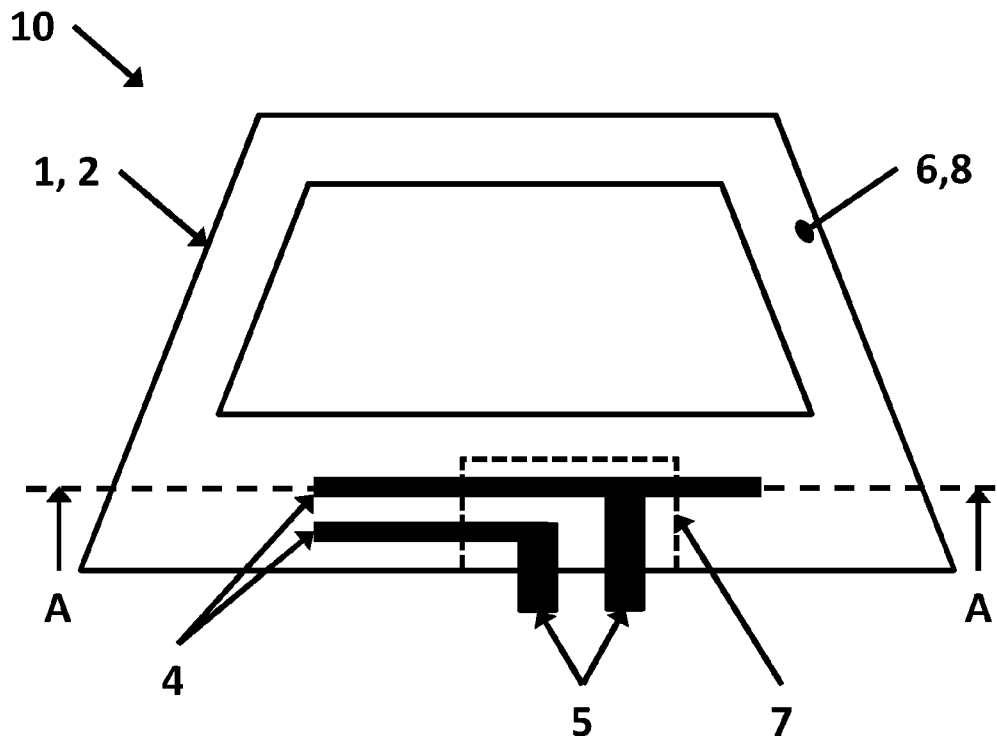
FIG. 3 is an embodiment of the invention having a second ceramic ink layer.

FIG. 3 is an embodiment of the invention like FIG. 1, further comprising a second ceramic ink layer (8). The second ceramic ink layer (8) is positioned on a second surface of the laminated glass (10).

Figure 4:
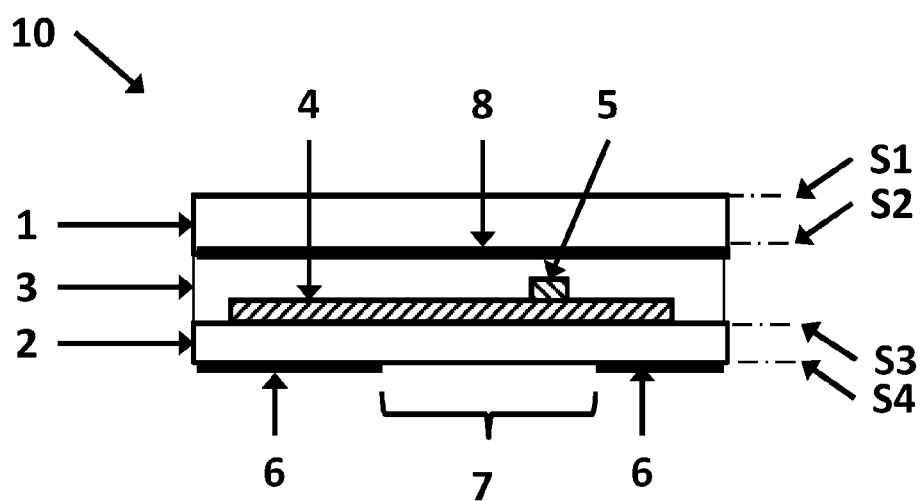
FIG. 4 is the embodiment of FIG. 3 in cross-section.

FIG. 4 is a cross-section of the embodiment in FIG. 3. The second ceramic ink layer (8) obscures a view of the gap (7).

Figure 5:
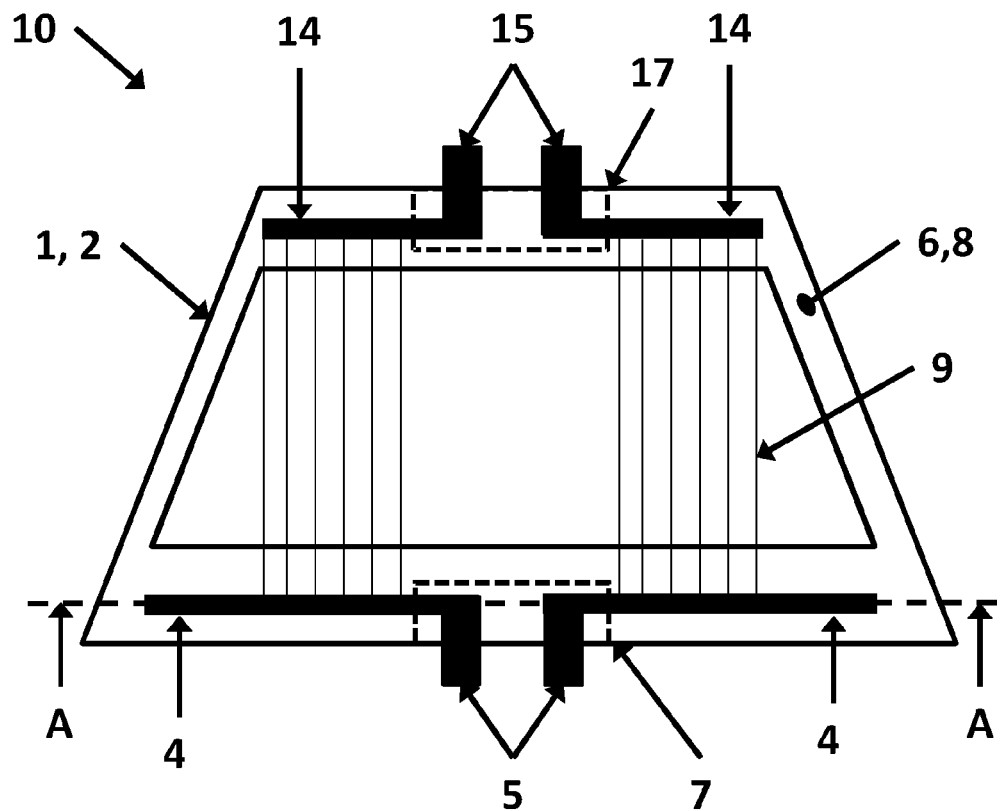
FIG. 5 is an embodiment of the invention having wires as a conductive element.

FIG. 5 is an embodiment of the invention like FIG. 3, further comprising a heating element (9) extending between a first conductive strip (4) at the bottom edge of the laminated glass and a second conductive strip (14) at the top edge of the laminated glass. The heating element (9) comprises a plurality of heating wires. First and second conductive strips (4, 14) each have two parts supplied separately by two first connectors (5) and two second connectors (15) respectively, to allow independent switching of two heating zones (left, right of the laminated glass). A second gap (17) in the ceramic ink layer (6) is provided in a region where the second conductive strips (14) overlap the second connectors (15).

Figure 6:
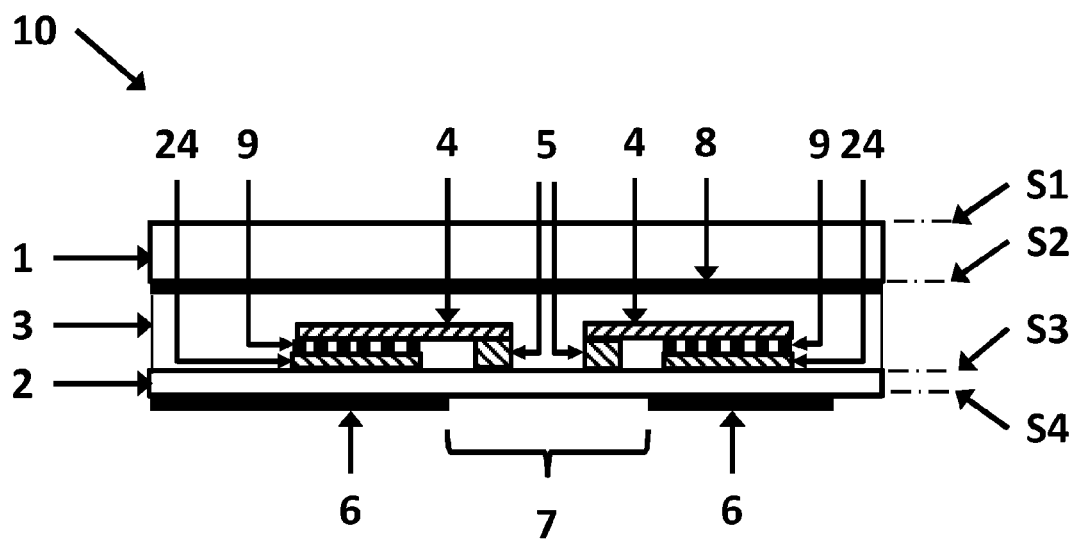
FIG. 6 is the embodiment of FIG. 5 in cross-section.

FIG. 6 is a cross-section of the embodiment of FIG. 5, showing that the heating wires are sandwiched between the first conductive strip (4) and a third conductive strip (24) for better electrical contact. Preferably, a strip of low melting point solder (not shown) is configured along the length of first and/or third conductive strips (4, 24) so that the solder melts during a lamination process and flows around the heating wires. The first conductive strip (4) may be positioned on the ply of interlayer material (3) such that the connector (5) is closer to the surface (S3) of the second glass sheet (2).

Figure 7:
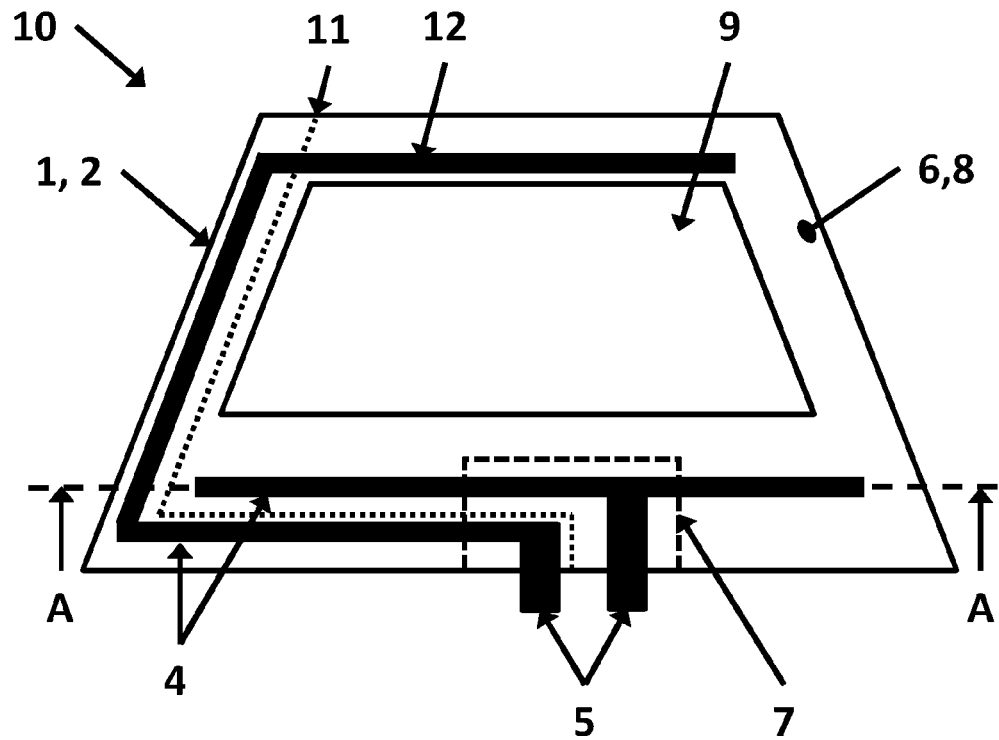
FIG. 7 is an embodiment of the invention having a coating as conductive element.

FIG. 7 is an embodiment of the invention like FIG. 5, except the heating element (9) is a transparent conductive coating without separate heating zones. Two connectors (5) are provided side by side at the bottom edge of the laminated glass and are electrically isolated from each other by a deletion line (11) in the transparent conductive coating. One of the conductive strips (4) is provided with a conductive strip extension (12) configured along a side edge and along the top edge of the laminated glass, to form a second busbar for supplying electrical power to the heating element (9).

Figure 8:
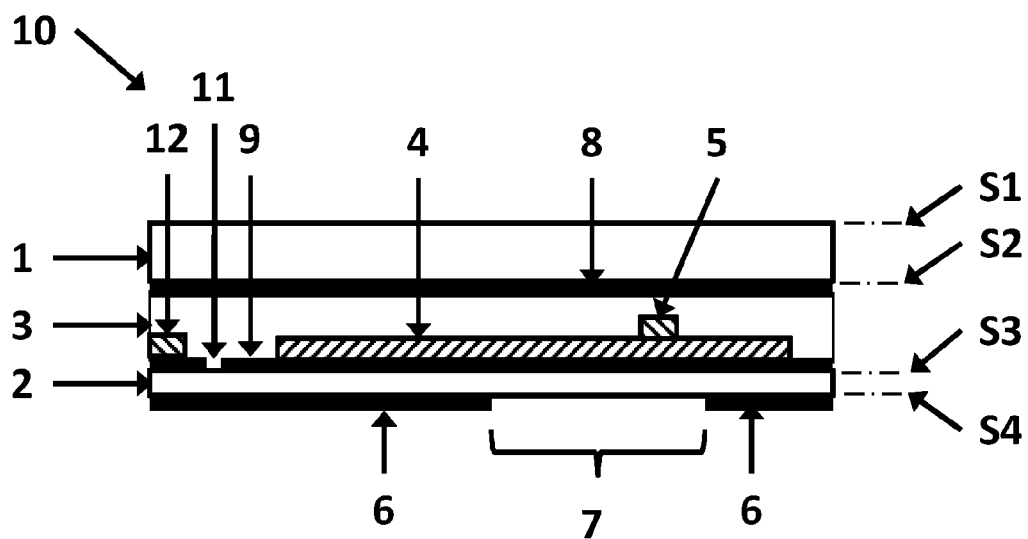
FIG. 8 is the embodiment of FIG. 7 in cross-section.

FIG. 8 is a cross-section of the embodiment of FIG. 7, showing that the deletion line (11) in the transparent conductive coating causes part of the heating element (9) near the side edge to be permanently not heated.

Figure 9:
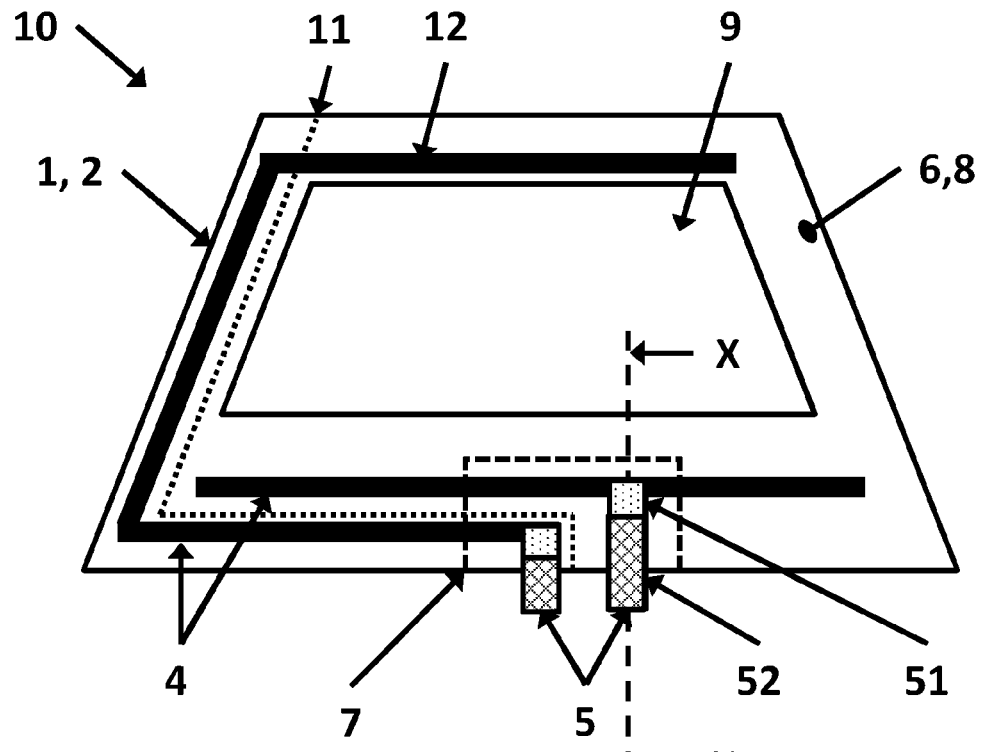
FIG. 9 is an embodiment of the invention showing detail of the connector.

FIG. 9 is an embodiment of the invention like FIG. 7, wherein the connector (5) is disclosed in more detail in the form of an insulated cable, for example a flat cable, comprising a conductor (51) at least partly insulated by an insulating film (52) and attached to the second glass sheet (2) by an adhesive film (53) serving as a water barrier. The insulating film (52) typically comprises two layers sandwiching the conductor (51), at least one layer having an epoxy adhesive to bond the two layers and to make a seal at each side of the conductor (51). The epoxy adhesive may be heat cured.

Figure 10:
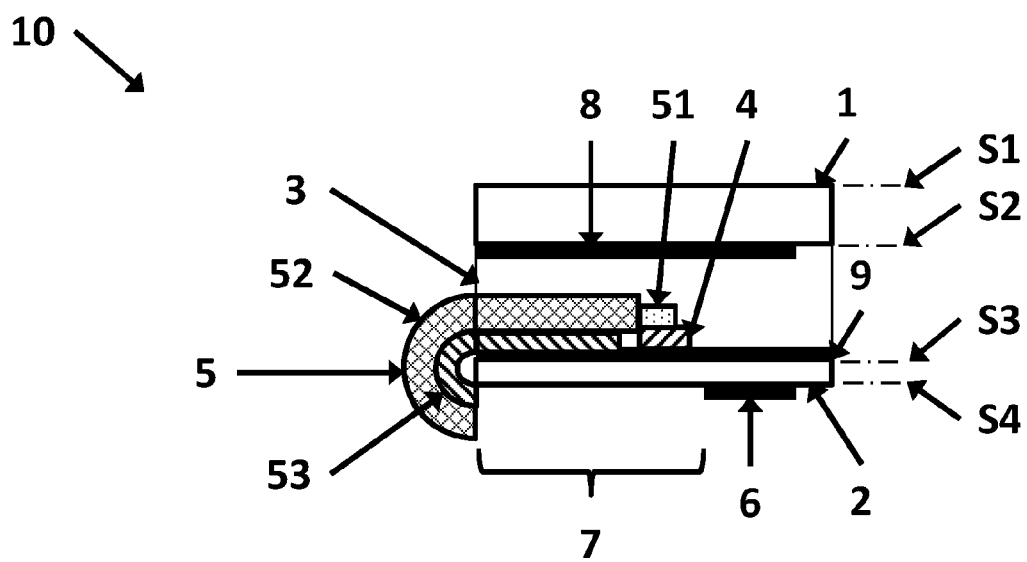
FIG. 10 is the embodiment of FIG. 9 in cross-section.
Figure 11:
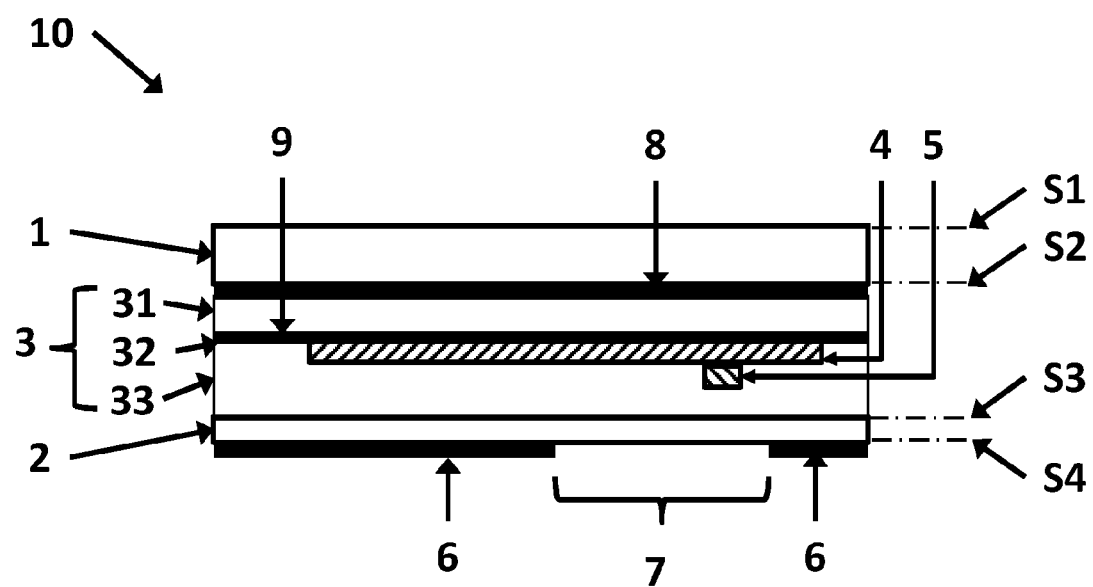
FIG. 11 is another embodiment of FIG. 7 in cross-section.

FIG. 10 is a cross-section of the embodiment of FIG. 9, on the line X-X, showing that the connector (5) can be folded around an edge of the second glass sheet (2). The adhesive film (53) may be attached to surface four (S4) in the gap (7).

Examples and Comparative Examples

Four examples of the invention and four comparative examples were made having common features shown in Table 1.

TABLE 1

| Part # | Feature | Value | Unit |
|---|---|---|---|
| 1 | First glass sheet thickness | 2.1 | mm |
| 2 | Second glass sheet thickness | 1.0 | mm |
| 3 | Interlayer material thickness | 0.76 | mm |
| 5 | Connector total thickness at edge | 330 | µm |
| 51 | Connector conductor thickness | 100 | µm |
| 52 | Connector insulating film thickness (including bonding adhesive, e.g. epoxy adhesive) | 50 | µm |
| 53 | Connector adhesive film (water barrier) thickness | 130 | µm |

Differences between the four examples are shown in Table 2.

TABLE 2

| Example | Connector location | Conductive strip thickness μm |
|---|---|---|
| 1 | Side edge | 50 |
| 2 | Side edge | 100 |
| 3 | Bottom edge | 50 |
| 4 | Bottom edge | 100 |

Five samples of each of the four examples, total 20 samples were manufactured having a gap (7), i.e. absence of the ceramic ink layer (6), in the region where the conductive strip (4) overlaps the connector (5). All twenty samples were subjected to an industry standard test for thermal cycling. All twenty samples passed the test.

For each of the four examples a comparative example was manufactured having a ceramic ink layer (6) on surface four (S4) in the region where the conductive strip (4) overlaps the connector (5). At least 50% of the comparative examples failed the thermal cycling test.

KEY TO THE DRAWINGS 1, 2—First and second glass sheets
3—Ply of interlayer material
4—Conductive strip
5—Connector
6—Ceramic ink layer
7—Gap
8—Second ceramic ink layer
9—Heating element
10—Laminated glass
11—Deletion line
12—Conductive strip extension
14—Second conductive strip
15—Second connector
17—Second gap
24—Third conductive strip
31, 32, 33—First, second and third plies of interlayer material
51—Conductor
52—Insulating film
53—Adhesive film
S1, S2, S3, S4—First, second, third, fourth surfaces

The invention claimed is:

1. A laminated glass, comprising:
   first and second glass sheets and a ply of interlayer material disposed therebetween;
   a conductive strip disposed on the ply of interlayer material;
   a connector arranged at an edge of the second glass sheet;
   a ceramic ink layer on a surface (S4) of the second glass sheet not facing the ply of interlayer material and partly obscuring the conductive strip;
   a gap in the ceramic ink layer configured so that the conductive strip is in contact with the connector in the gap.

2. A laminated glass according to claim 1, wherein the conductive strip overlaps the connector.

3. A laminated glass according to claim 1, wherein the first glass sheet and the second glass sheet each possess a thickness, the thickness of the first glass sheet or the second glass sheet being less than or equal to 2 mm.

4. A laminated glass according to claim 1, wherein the first glass sheet and the second glass sheet each possess a thickness, the thickness of the first glass sheet being greater than thickness of the second glass sheet.

5. A laminated glass according to claim 1, wherein the ply of interlayer material possesses a thickness less than or equal to 0.76 mm.

6. A laminated glass according to claim 1, wherein the gap extends from the edge of the second glass sheet towards a centre of the second glass sheet.

7. A laminated glass according to claim 1, wherein the gap extends parallel with the edge of the second glass sheet.

8. A laminated glass according to claim 1, wherein the conductive strip possesses a thickness of 100 μm or less.

9. A laminated glass according to claim 1, wherein the connector comprises a conductor and an insulating film at least partly covering the conductor.

10. A laminated glass according to claim 1, wherein the connector comprises a conductor, the conductor possessing a conductor thickness of 100 μm or less.

11. A laminated glass according to claim 1, wherein the connector comprises an insulating film possessing an insulating film thickness of 50 μm or less.

12. A laminated glass according to claim 1, wherein the connector is bonded to the second glass sheet by an adhesive film.

13. A laminated glass according to claim 1, wherein the first glass sheet and the second glass sheet each possess a thickness, the thickness of the first glass sheet or the second glass sheet being less than or equal to 0.7 mm.

14. A laminated glass according to claim 1, wherein the gap extends from the edge of the second glass sheet towards a centre of the second glass sheet by at least 22 mm.

15. A laminated glass according to claim 1, wherein the gap extends parallel with the edge of the second glass sheet by at least 32 mm.

16. A laminated glass according to claim 1, wherein the connector is bonded to the second glass sheet by an adhesive film, the adhesive film possessing a thickness of 130 μm or less.

17. A method for manufacturing a laminated glass, comprising:
   providing first and second glass sheets and disposing a ply of interlayer material between the first and second glass sheets;
   disposing a conductive strip on the ply of interlayer material or on the second glass sheet;
   arranging a connector at an edge of the second glass sheet for connecting with an external circuit;
   depositing a ceramic ink layer on a surface of the second glass sheet not facing the ply of interlayer material and partly obscuring the conductive strip; and
   configuring a gap in the ceramic ink layer so that the conductive strip is in contact with the connector in the gap.

18. A method for manufacturing a laminated glass, according to claim 17, comprising configuring the conductive strip to overlap the connector.

19. Use of the laminated glass according to claim 1, for windows of buildings, street furniture, touch-screens, doors for white goods or windows of vehicles for land, sea and air.

* * * * *